March 25, 1958  R. H. OSBRINK  2,827,678
MOLD AND METHOD OF MAKING SAME
Filed Aug. 30, 1954  3 Sheets-Sheet 1
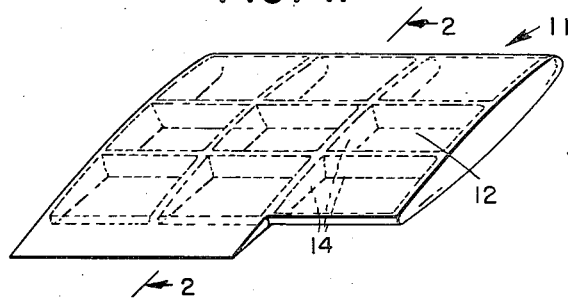
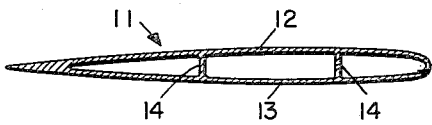
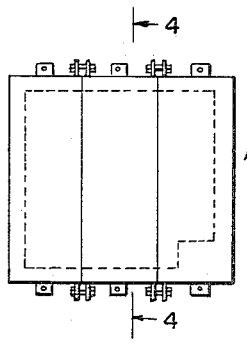
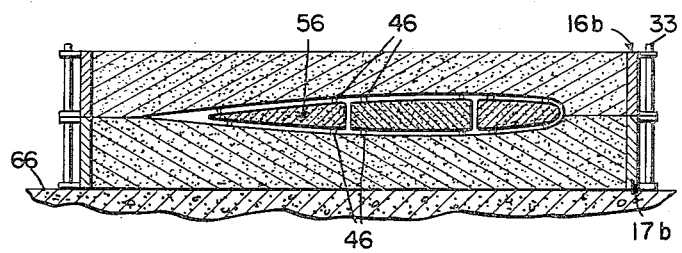
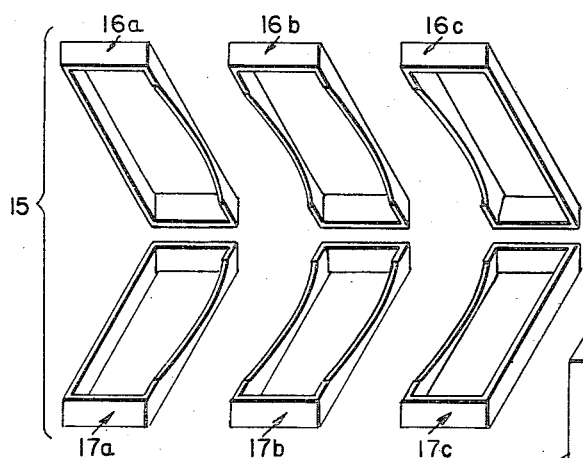
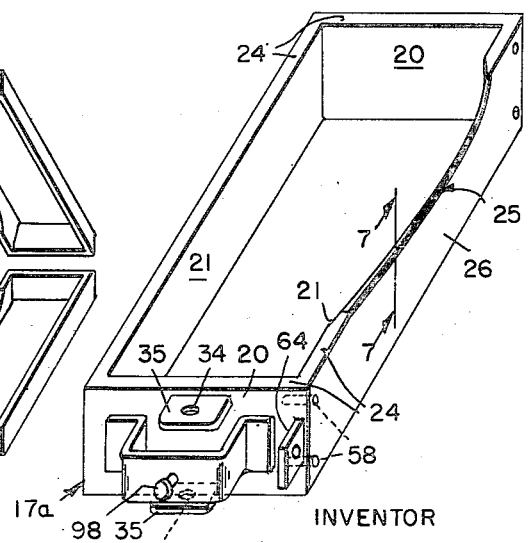
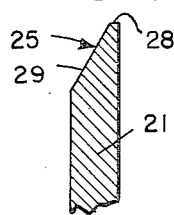
INVENTOR
RAYMOND H. OSBRINK
BY
Mason & Graham
ATTORNEYS March 25, 1958 R. H. OSBRINK 2,827,678
MOLD AND METHOD OF MAKING SAME
Filed Aug. 30, 1954 3 Sheets-Sheet 2
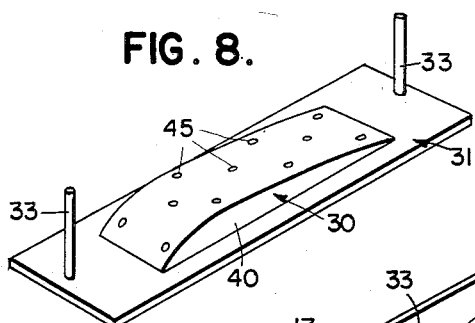
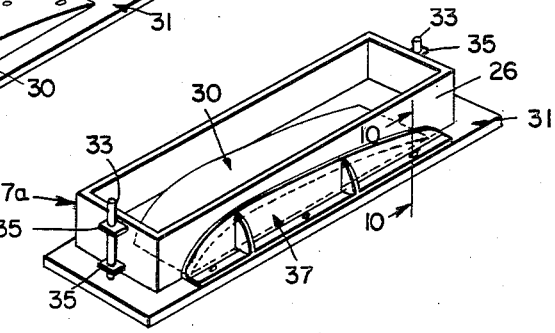
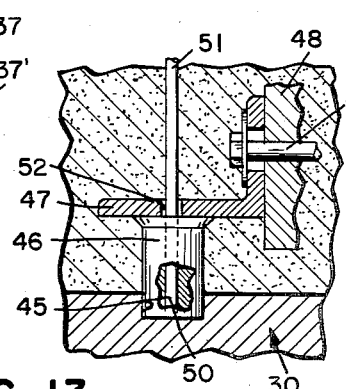
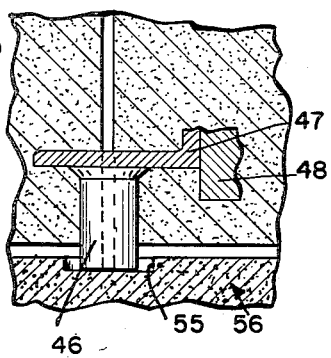
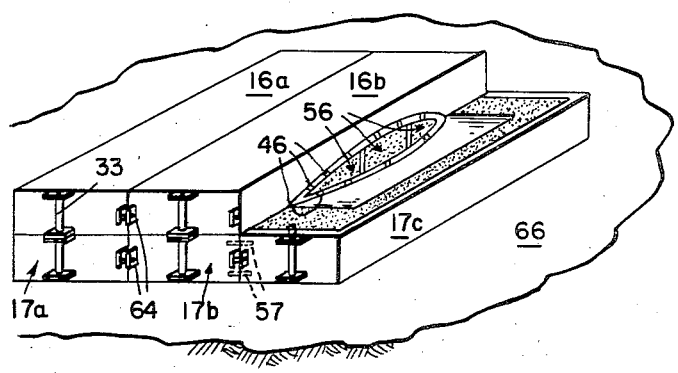
INVENTOR
RAYMOND H. OSBRINK
BY
*Mason & Graham*
ATTORNEYS

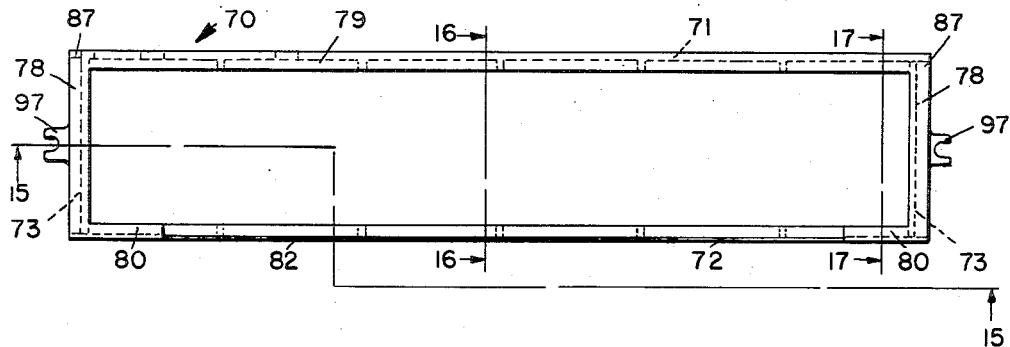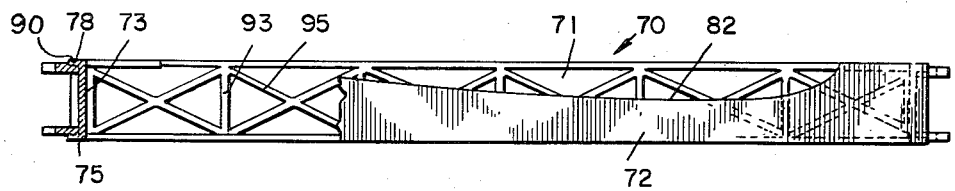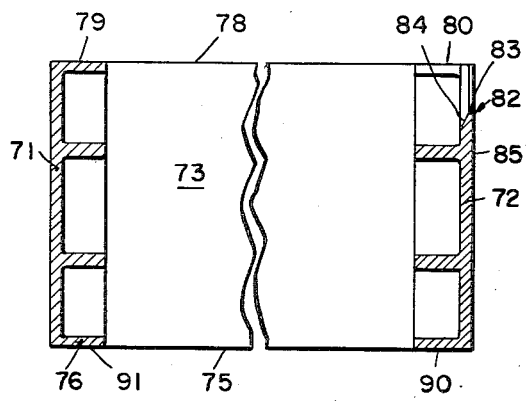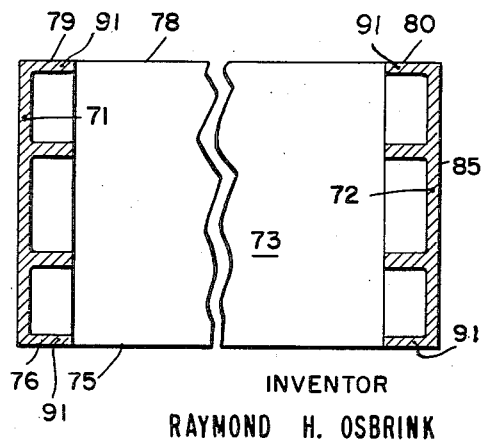

United States Patent Office 2,827,678
Patented Mar. 25, 1958

2,827,678

MOLD AND METHOD OF MAKING SAME

Raymond H. Osbrink, Los Angeles, Calif.

Application August 30, 1954, Serial No. 453,028

11 Claims. (Cl. 22—131)

This invention has to do with the making of metal castings, particularly large, hollow, thin-walled castings of nonferrous metal.

Heretofore it has not been practicable to cast relatively large, thin-walled, hollow, intricate members of non-ferrous metal, such as aircraft wing sections, in a single casting, because of the difficulties involved in preparing a large mold. Consequently it has become the practice to form wing sections and the like by casting the upper and lower halves of the wing separately and subsequently bolting or otherwise securing the halves together. This practice is disadvantageous in that maximum strength cannot be obtained throughout the wing and there is also the objectionable added weight of the bolts or other securing means used. A major difficulty and one which has prevented the successful casting of large, intricate castings of the nature under consideration has been the problem of properly ramming the molding sand in a large mold. It has been found practically impossible to completely prepare the mold and pour the casting in a single working day. Because of this, the mold sand dries unduly in parts of the mold with consequent loss of green strength. Even where it is possible to prepare the mold and pour the metal the same day the size of a mold is necessarily so great that it cannot be formed from end to end at the same time and this results in the mold having different properties throughout its length, some parts being drier than others, resulting in uneven shrinkage. Also, the weight of the sand in a large mold is so great that it is impossible to lift and place the mold without sagging occurring and this destroys the dimensional accuracy beyond allowable tolerances.

An object of the invention is to provide a novel method and apparatus for making large, thin-walled, intricate, hollow castings successfully which overcomes the above-noted and other disadvantages of conventional methods of making castings, particularly those of nonferrous metals, such as alloys of aluminum and magnesium.

Another object is to provide a novel method of making a mold for a large, intricate metal casting which insures that all portions of the mold will have the same properties and that the mold sand will possess the requisite green strength and quality throughout at the time of pouring the metal.

A further object is to provide a novel method of making a mold for casting elements of the type indicated which utilizes a plurality of mold sections separately and simultaneously formed and which includes a method of and means for insuring the alignment of the various mold sections to make up the completed mold or flask.

Still another object is to provide a method of making relatively large castings of the type indicated which permits the use of a plurality of core elements.

A further object is to provide a method of making metal castings of hollow construction which permits of sectional assembly of the mold and the checking of the clearances between individual cores and the upper and lower parts of the mold as the same is assembled.

Still another object is to provide a novel mold construction.

These and other objects will be apparent from the drawing and the following description. Referring to the drawing:

Fig. 1 is a perspective view of a simplified typical casting;

Fig. 2 is a section on line 2—2 of Fig. 1;

Fig. 3 is a plan view of a mold;

Fig. 4 is a sectional view on line 4—4 of Fig. 3 on a larger scale;

Fig. 5 is a schematic exploded view in perspective of the sections of the flask;

Fig. 6 is a perspective view of one flask section;

Fig. 7 is a section on line 7—7 of Fig. 6;

Fig. 8 is a schematic perspective view of a pattern board and pattern;

Fig. 9 is a schematic perspective view of a flask section on the pattern board ready for ramming;

Fig. 10 is a section on line 10—10 of Fig. 9 on a larger scale and showing the molding sand in place;

Fig. 11 is an enlarged fragmentary sectional view showing a method of providing core supports;

Fig. 12 is an enlarged fragmentary sectional view showing a method of supporting the core;

Fig. 13 is a perspective view showing the mold nearly assembled;

Fig. 14 is a plan view of a typical flask section;

Figs. 15, 16, and 17 are sectional views on lines 15—15, 16—16, and 17—17 respectively of Fig. 14.

More particularly describing the invention, by way of example I show in Figs. 1 and 2 a hollow casting 11 in the nature of an aircraft wing section having assumed dimensions of several feet in length and width which is of a type that can readily be cast by my method but which is not cast as a unit by conventional methods because of the difficulties involved as pointed out above. The casting shown is much simpler in construction and lacks the intricate detail of an actual wing section and may thus be considered as being largely schematic. The casting has an upper wall or skin 12, a lower wall or skin 13 and may have several ribs 14 therebetween.

In order to form the casting I prepare a sectional mold, such as the composite flask 15, having cope sections 16a, 16b, 16c and having drag sections 17a, 17b, 17c (Fig. 5). The number of flask sections may vary for different castings depending upon the size of the casting, it being the purpose to provide cope and drag sections of a size that can be readily handled, particularly of a size suitable for convenient, uniform ramming throughout the section. In the completed mold the cope sections abut side to side and the drag sections are similarly arranged. The particular mold chosen for illustration is rectangular, since this approximates the shape of the casting 11 to be produced, however, for other castings the mold and mold sections might have another shape, as that of a parallelogram with other than right angles. Each flask section has a pair of end walls 20 and a pair of side walls 21. The inner edges 24 of the side and end walls of each flask section are formed to be coplanar, except where the edges of the side walls are recessed as will later be explained, to provide for accurate alignment and fitting of the cope and drag sections when assembled. The outer surfaces of the side walls of the individual sections which abut when the sections are assembled are each formed to provide a true flat surface 26 normal to the plane of the inner edges of the sections, the outer side wall surface of one side of a section being parallel to its other outer side wall surface. I prefer to make the flask sections of metal and to machine the surfaces 26, thereby insuring accuracy.

The abutting side walls of the individual cope and drag sections are recessed at 25 as previously indicated sufficiently to freely accommodate the casting to be produced. It is a particular feature of the invention that the sides are recessed or cut away to the same general contour as the pattern (or the casting to be made) but with sufficient clearance that, during ramming, these recessed edges are covered by a layer of molding sand 27 (Fig. 10). Preferably the recessed edges 25 are formed to provide a thin flat section 28 normal to and intersecting the side surface 26 and a tapered or beveled wider inner section 29 (Fig. 7). The thickness of the layer of sand over the surface 28 may be about 5/8", or within the range of from 1/8" to 1".

In my process a plurality of patterns are made for a single casting, the patterns together making up the configuration of the casting desired. Thus there is provided one pattern for each flask section. All the mold sections are rammed at about the same time apart from each other to insure an even moisture content and consequent uniform green strength of the sand throughout the completed mold when the flask parts have been completed and finally assembled. Also, by ramming convenient-sized flask sections individually the ramming can be properly accomplished while this would not be possible with an unduly large flask section.

The individual patterns 30 are mounted on pattern boards 31 of suitable construction. Referring to Fig. 8 I show the pattern for the drag section 17a. Each pattern board is provided with means for aligning the mold section thereon and this has been shown as comprising the upright pins 33, one at each end of the board. Suitable pin-receiving holes 34 are provided in a pair of vertically spaced lugs 35 at each end of each of the flask sections. Any suitable conventional means (such as clamps, not shown) may be provided for securing the flask section to the pattern board during ramming.

Against the side of the flask section having a recessed inner edge in the side wall, or against each side where each has a recessed edge, I provide a sand-retaining strip for use during ramming. This strip, indicated by 37, (Figs. 9 and 10), is preferably removably secured to the pattern board by a flange portion 37' as by screws 38. The retaining strip is of greater width than the depth of the recess in the flask section and in consequence a part of the inner surface thereof lies against the outer surface 26 of the flask section. The strip also is against the vertical side 40 of the pattern, the latter being flat and normal to the upper face of the pattern board. In this connection it may be pointed out that the pattern is made to extend laterally to the plane of the outer surface of the side wall of the section where that side wall abuts an adjacent section. Thus the inner surface of the retaining strip, the outer surface of the flask section, and the side surface of the pattern are all substantially in the same plane. In consequence, when the mold sand is rammed in the flask section against the pattern, a layer of sand 27 extends outwardly of the interior of the flask section between the recessed inner edge thereof and the pattern to the inner surface of the retaining strip. Apart from taking steps to insure that this layer of sand is properly packed, the sand is rammed against the pattern in the usual way, any conventional sand-retaining bars or other means being used in the flask section. Sand-retaining bottom boards are used during handling of the drag sections, but these may be removed prior to placing the sections on the floor.

In making hollow castings I prefer to support the core, or core sections, by means of core support elements known as "ram-up cores." The ram-up cores, which may be formed of baked molding sand, are anchored in the sand body 44 of the flask section at the time of ramming in the following manner. Referring to Figs. 8, 11 and 12, the pattern 30 is provided with a plurality of laterally spaced recesses 45 each of which accommodates a ram-up core 46 positioned therein prior to ramming of the sand against the pattern. The location and number of the recesses 45, and hence the location and number of the core supports, are accurately predetermined depending upon the characteristics of the casting to be produced and of the core body to insure proper support and alignment of the core body.

The individual ram-up cores 46 are supported at their bases in the mold sand by angle iron brackets 47 secured to the conventional sand-retaining bars 48, as by bolts 49.

One of the features of my process is the use of a preformed vent passage 50 in the ram-up core. A wire 51 is provided in each of these and extends through a hole 52 in the bracket 47 and through the body of the molding sand. While the wire can be run through after the ramming of the sand in the mold, I prefer to place the wire before ramming, since this insures registration of the passage 50 in the ram-up core with the hole 52 in the bracket 47. The wires are withdrawn after the flask sections are placed over the main core, leaving vent passages through the ram-up cores and through the body of mold sand for the escape of gases.

Since I prefer to reinforce the casting about each of the holes that are made therein by the ram-up cores, I provide core-locating recesses 55 in the core sections 56 which are of greater diameter than the diameter of the projecting ends of the ram-up cores. The depth of these recesses is less than the depth of the recesses 45 in the pattern by an amount equal to the thickness of the casting wall desired.

As the casting shrinks, a shearing action may develop in the ram-up cores which have their outer end portions embedded in the casting body, and, unless relieved, this may tend to restrict the shrinkage. I overcome this by making the ram-up cores in a manner such that they are hard, firm and strong at their ends but somewhat less strong in a region intermediate their ends where they project from the body of mold sand. This is accomplished by using less binder in the sand in this region and/or by degree of ramming. The ram-up cores will thus shear when subjected to the shearing action developed by shrinkage of the casting, permitting the casting shrinkage to take place evenly and without local restrictions.

After the ramming of a flask section has been completed, the retaining strip 37 is first removed from the pattern after which the pattern is drawn in the usual manner.

As previously indicated, the flask sections are rammed substantially simultaneously so that they are completed at about the same time or in a manner such that there is no great time interval between the completion of the first mold section rammed and completion of the last mold section rammed. In consequence, the green strength quality of the mold sand is substantially equal from one section of the mold to the other, making for a high quality casting. After completion of the ramming the drag sections of the mold are assembled. The outer surfaces 26 of the sides of the sections, being square or normal to the inner edges of the mold sections, when in abutment insure alignment of the sections in one direction while locating pins or dowels 57 and holes 58 in the sections insure alignment in another direction. Bolt-type clamping or securing elements 64 are provided between the adjacent sections to lock them together. Also, the drag sections are provided with coplanar lower edge surfaces at right angles to their sides and these rest on the floor surface 66 which is true flat and preferably level.

It will be apparent that, when the mold sections are assembled, there is metal-to-metal contact of the sides of the sections (assuming the flask sections are of metal) insuring accuracy of alignment and sand-to-sand contact of the mold sand in the region of the recessed edges.

Prior to assembly of the completed drag sections the core is placed. I prefer to use a core made up of a plurality of core sections 56. These are individually rammed in core boxes and are baked in the customary manner.

As previously indicated, the core sections are supported by the ram-up cores 46 provided in the mold sections. After the core sections are all placed the drag sections are assembled. Subsequently the cope sections are assembled on the drag sections. During assembly, holes 34 in lugs 35 on the drag and cope sections receive aligning pins 33. The cope sections are secured to each other by bolt means 64 the same as that used to secure the drag sections.

Another advantage accruing from using a plurality of mold sections and core sections is that this makes it possible to carefully check the clearance space between the core and the mold sections first as each core section is set, later as the drag sections are brought together, and finally as each cope section is assembled, insuring accuracy of the casting.

While it has not been shown or described, it is to be assumed that the mold is gated and vented in a conventional manner.

The Figs. 1–13 of the drawing are, to a large extent, diagrammatic, and are not detailed, accurate drawings of the mold sections. By way of further example, in Figs. 14–18 I show a flask section of a type I prefer to use. Referring to these figures, 70 generally indicates an end section. This has side walls 71 and 72 and end walls 73. The end walls have outer edges 75 and the side walls, outer edges 76, all of which are in a common plane. 78 indicates the inner edges of the end walls and these are coplanar with the inner edge 79 of side wall 71 and with the inner edge portions 80 of side wall 72. The remainder of the inner edge of the latter side wall is recessed at 82 to the general contour of the pattern but with some clearance. This edge has a narrow portion 83 and a chamfered or beveled portion 84. The outer surfaces 85 of the sides are formed flat and disposed normal to the planes of the inner and outer edges of the mold section whereby several mold sections can be assembled in accurate alignment as previously explained.

The end walls of the mold are provided with exterior peripheral flanges 87.

A feature of the mold lies in the construction of the side walls. The main body of each side wall is relatively thin and this is reinforced by integral ribs. The latter are shown as comprising marginal ribs 90 at the outer edges of the side walls, an inner marginal rib 91 along side wall 71, laterally spaced upright ribs 93, and intermediate diagonal ribs 95 in a crossed or "X" pattern. The ribbed construction serves to provide a rigid, yet relatively lightweight metal mold section and also serves as anchor means for holding the mold sand in place.

Each end wall may be provided with vertically spaced slotted (or apertured) lugs 97 for the purposes heretofore described. Also suitable trunnions can be provided, such as trunnion 98 (Fig. 6).

While I have shown and described a preferred form of my invention, I contemplate that various changes and modifications can be made therein without departing from the invention, the scope of which is indicated by the following claims.

I claim:

1. In a method of preparing a sand-type mold for a metal casting, the steps of forming a flask comprised of a plurality of cope and drag sections adapted to fit together in a predetermined manner with the cope sections in abutment side to side and the drag sections in abutment side to side and with the abutting sides of the sections recessed at their inner edges sufficiently to accommodate the casting, providing a temporary retaining strip against the outer side of each flask section on each recessed side edge thereof to form a mold sand retaining wall in the plane of the outer side of the section in the region of the recessed edge, ramming mold sand into the sections individually against individual patterns, removing said temporary retaining strip from each said section, drawing the patterns, and joining said sections to form a complete flask.

2. In a method of preparing a single cavity mold for a metal casting, the steps of forming a flask comprised of a plurality of cope and drag sections adapted to fit together in a predetermined manner with the cope sections in abutment side to side and the drag sections in abutment side to side to form a single cavity and with the abutting sides recessed at their inner edges somewhat more than required to accommodate for the cavity, providing a temporary retaining strip against the outer side of each of the recessed sides of said flask sections, ramming sand in the flask sections individually against individual patterns to fill the sections and the space between each recessed side edge and the pattern, subsequently removing said retaining strips, drawing said patterns, and joining the flask sections to form the complete flask.

3. The method set forth in claim 2 in which the inner edges of each flask section are formed to be coplanar except where recessed.

4. The method set forth in claim 2 in which the recesses in the side edges of the sections of the flasks are individually contoured to correspond generally to the contour of the pattern and are deep enough to allow for clearance between each and the pattern.

5. In a method of making a sand-type mold for a metal casting in which the mold includes a flask comprised of a plurality of cope and drag sections adapted to fit together with the cope sections abutting each other and the drag sections abutting each other side to side, the abutting sides of said sections having recessed inner edges to provide clearance for the casting and a layer of mold sand, the method of preparing an individual section of the flask which includes the steps of forming a pattern for the individual section to extend laterally to the plane of the recessed side edge of the section when assembled with the section, providing a temporary retaining strip against the outer side of the section in the region of the recessed edge to form a mold sand retaining wall in the plane of the outer side of the section, ramming mold sand into the section against the pattern assembled therewith to fill the section and the space between the recessed inner edge of the section and the pattern, removing said retaining strip, and drawing the pattern.

6. A single cavity mold comprising a flask having a plurality of box-like cope and drag sections secured together, each of said sections having side walls, adjacent side walls of said cope and drag sections respectively being in abutment, the adjacent abutting side walls of said sections having recessed inner edges, rammed molding sand in each of said sections defining the cavity, said molding sand in each section extending laterally of each recessed inner edge of the section and terminating in the plane of the outer surface of the recessed edge side wall and against the sand in the adjacent section.

7. A mold as set forth in claim 6 in which said recessed inner edges are contoured to correspond generally to the contour of the desired cavity.

8. In a mold having a cope and a drag section rammed with mold sand and secured together to form a mold cavity, and a core in said cavity, means supporting said core comprising a plurality of ram-up core elements embedded in the sand of the cope and drag sections, said ram-up core elements projecting into the cavity and engaging said core, a plurality of bars mounted in said cope and drag sections, and brackets on said bars, each of said ram-up cores being positioned against a bracket.

9. A mold as set forth in claim 8 in which a vent passage is provided longitudinally through certain of the ram-up cores and their associated brackets and the adjacent mold therebeyond.

10. The method of making a metal casting which comprises providing a flask having a plurality of sections, each section having a side wall for abutment with the next adjacent section, said side wall of each section being recessed at its inner edge to provide clearance between it and the pattern with which it is subsequently to be associated, forming a plurality of patterns, one for each flask section, said patterns together making up the form of the casting desired, associating the patterns with their respective flask sections, substantially simultaneously ramming mold sand into the sections against their respective patterns with the sections separately disposed, drawing the patterns, joining the sections to form a composite flask having a single cavity, and pouring molten metal into the cavity of the flask.

11. In a mold for producing a hollow casting, flask means provided with a body of mold sand defining a cavity, a core body in said cavity, a preformed core body supporting ram-up core embedded into said bed of mold sand and projecting therefrom into said cavity, and a vent passage forming wire extending through said body of mold sand and said ram-up core; said wire being axially removable from said body of mold sand and said ram-up core before pouring of the casting material whereby to provide a venting passage extending through said ram-up core and said body of mold sand.

References Cited in the file of this patent
UNITED STATES PATENTS

| | | |
|---|---|---|
| 471,324 | Conradson | Mar. 22, 1892 |
| 474,210 | Caskey et al. | May 3, 1892 |
| 524,543 | Drake et al. | Aug. 14, 1894 |
| 580,205 | Barnett | Apr. 6, 1897 |
| 581,017 | Bryant | Apr. 20, 1897 |
| 1,233,151 | Weaver | July 10, 1917 |
| 1,804,400 | Davis | May 12, 1931 |
| 1,883,963 | Kramer | Oct. 25, 1932 |
| 1,945,358 | Raible | Jan. 30, 1934 |